(12) United States Patent
Weng et al.

(10) Patent No.: US 7,078,882 B2
(45) Date of Patent: Jul. 18, 2006

(54) ACTIVE CLAMPING CIRCUIT AND POWER SUPPLY SYSTEM USING THE SAME

(75) Inventors: Hsiang-Chung Weng, Taipei (TW); Kai-Fu Chen, Taipei (TW); Sheng-Chung Huang, Taipei (TW); Chih-Jung Lin, Taipei (TW)

(73) Assignee: Asustek Computer Inc., Taipei (TW)

( * ) Notice: Subject to any disclaimer, the term of this patent is extended or adjusted under 35 U.S.C. 154(b) by 146 days.

(21) Appl. No.: 10/910,339

(22) Filed: Aug. 4, 2004

(65) Prior Publication Data

US 2005/0068794 A1    Mar. 31, 2005

(30) Foreign Application Priority Data

Sep. 26, 2003   (TW) ............................... 92126596 A

(51) Int. Cl.
*G05F 1/40*   (2006.01)

(52) U.S. Cl. ...................... 323/224; 323/284; 323/266

(58) Field of Classification Search ................ 323/222, 323/224, 225, 266, 271, 276, 284, 285; 361/91.7
See application file for complete search history.

(56) References Cited

U.S. PATENT DOCUMENTS

| 6,600,298 B1 * | 7/2003 | McDonald et al. ......... 323/271 |
| 6,724,174 B1 * | 4/2004 | Esteves et al. .............. 323/224 |
| 6,737,846 B1 * | 5/2004 | Ben-Yaakov ................ 323/284 |

FOREIGN PATENT DOCUMENTS

TW              564078           7/1999

* cited by examiner

*Primary Examiner*—Jessica Han
(74) *Attorney, Agent, or Firm*—Birch, Stewart, Kolasch & Birch, LLP

(57) ABSTRACT

An active clamping circuit. The active clamping circuit is applicable to a DC-to-DC conversion circuit, and has an output terminal to supply an output voltage to a load. In the active clamping circuit, a determining circuit is coupled to the DC-to-DC conversion circuit to determine the output detects the output voltage and to output a first enable signal when the output voltage is higher than a first predetermined voltage. A voltage adjustment circuit is coupled to the determining circuit to pull low the output voltage according to the first enable signal. An inductor has a first end coupled to the output terminal of the DC-to-DC conversion circuit, and a diode is coupled between the inductor and an input terminal of the DC-to-DC conversion circuit as a conductive path to channel discharge current to the input terminal of the DC-to-DC conversion circuit.

16 Claims, 4 Drawing Sheets

ACTIVE CLAMPING CIRCUIT AND POWER SUPPLY SYSTEM USING THE SAME

This Nonprovisional application claims priority under 35 U.S.C. § 119(a) on Patent Application No(s). 092126596 filed in Taiwan, Republic of China on Sep. 26, 2003, the entire contents of which are hereby incorporated by reference.

BACKGROUND OF THE INVENTION

1. Field of the Invention

The present invention relates to active clamping circuits, and more particularly, to an active clamping circuit applicable to a DC-to-DC conversion circuit.

2. Description of the Related Art

FIGS. 1a and 1b show a conventional step-down (buck) DC-to-DC conversion circuit 10. In the DC-to-DC conversion circuit 10 is coupled to an input voltage Vin and outputs an output voltage $V_{CORE}$ to a load LD. In the DC-to-DC conversion circuit 10, the switching devices $S_1$ and $S_2$ are switched alternately to maintain the output voltage $V_{CORE}$ at a predetermined voltage, such as 1.35V. When the output voltage $V_{CORE}$ is lower than the predetermined voltage, the switching device $S_1$ is turned on and the switching device $S_2$ is turned off such that the input voltage Vin charges the capacitor $C_o$ to pull high the output voltage $V_{CORE}$. On the contrary, when the output voltage $V_{CORE}$ is higher than the predetermined voltage, the switching device $S_1$ is turned off and the switching device is turned on such that the input voltage Vin stops charging the capacitor $C_o$.

Transient responses, however, typically occur when the load LD varies greatly, such as when the CPU is switched to suspend mode from normal mode or when the CPU is switched to suspend mode from suspend mode. As shown in FIG. 1a, for example, when the CPU is switched to normal mode from suspend mode, the load LD is transferred from a light to a heavy load such that the output voltage $V_{CORE}$ is instantly pulled low. Thus, the switching device $S_1$ is turned on and the switching device $S_2$ is turned off such that the capacitor $C_o$ is charged by the input voltage Vin to pull high the output voltage $V_{CORE}$. The rate of change in the inductor current $i_L$ is $$\frac{di_L}{dt} = \frac{Vin - V_{CORE}}{L}.$$

As shown in FIG. 1b, when the CPU is switched to suspend mode from normal mode, namely the load LD is transferred from a heavy to a light load such that the output voltage $V_{CORE}$ is instantly pulled high. Thus, the output voltage is instantly pulled high such that the switching device $S_1$ is turned off and the switching device $S_2$ is turned on to discharge the output voltage $V_{CORE}$ to the predetermined voltage by the switching device $S_2$. The rate of change in the inductor current $i_L$ is $$\frac{di_L}{dt} = \frac{-V_{CORE}}{L}.$$

When the load LD is transferred from a heavy to a light load (step-down period), however, the current rate is much smaller than that from light to heavy (step-up period) because the output voltage $V_{CORE}$ is much higher than the input voltage Vin in the conversion circuit 10. That is, the conversion circuit 10 has poor transient responses when load LD is transferred from a heavy to a light load (step-down period).

SUMMARY OF THE INVENTION

It is therefore an object of the present invention to pull low the voltage overshoot in the output voltage of a DC-to-DC conversion circuit by an active clamping circuit when the load is transferred from a heavy to a light, thereby improving the transient response of the conversion circuit.

According to the above mentioned object, the present invention provides an active clamping circuit to pull low the voltage overshoot in the output voltage thereby improving transient response of the DC-to-DC conversion circuit, and to retrieve discharge current by a conductive path when the load is transferred from a heavy to a light load.

According to the above mentioned object, the present invention provides an active clamping circuit applicable to a DC-to-DC conversion circuit, wherein the DC-to-DC conversion circuit has an output terminal to supply an output voltage to a load. In the active clamping circuit, a determining circuit is coupled to the DC-to-DC conversion circuit to detect the output voltage and to output a first enable signal when the output voltage is higher than a first predetermined voltage. A voltage adjustment circuit is coupled to the determining circuit to pull low the output voltage according to the first enable signal. An inductor has a first end coupled to the output terminal of the DC-to-DC conversion circuit, and a diode is coupled between the inductor and an input terminal of the DC-to-DC conversion circuit. The voltage adjustment circuit pulls voltage overshoot in the output voltage low when the output voltage is higher than the first predetermined voltage when the load is transferred from a heavy to a light load, thereby improving the transient response of the conversion circuit. Further, the active clamping circuit provides a conductive path by a diode to channel discharge current to the input terminal of the DC-to-DC conversion circuit.

BRIEF DESCRIPTION OF THE DRAWINGS

The present invention can be more fully understood by the subsequent detailed description and examples with reference made to the accompanying drawings, wherein.

DETAILED DESCRIPTION OF THE INVENTION

Figure 1A:
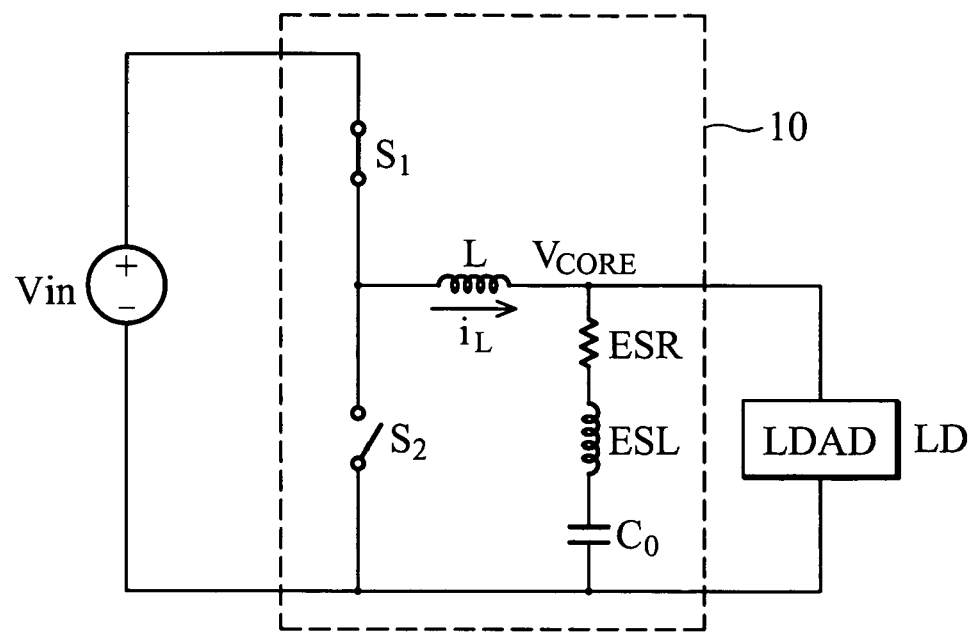
FIGS. 1a and 1b are diagrams of a conventional buck DC-to-DC conversion circuit.
Figure 1B:
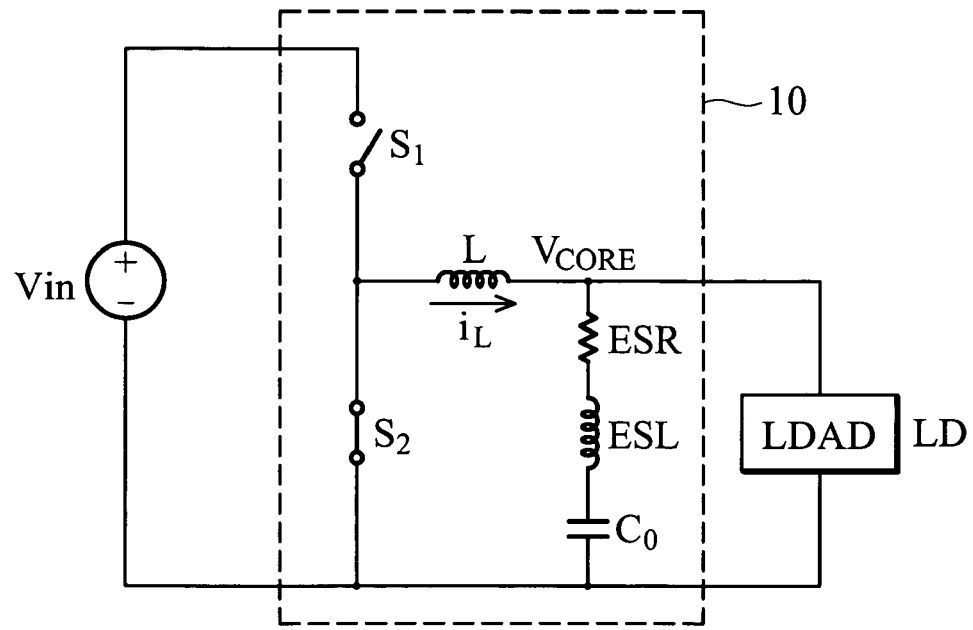
Figure 2:
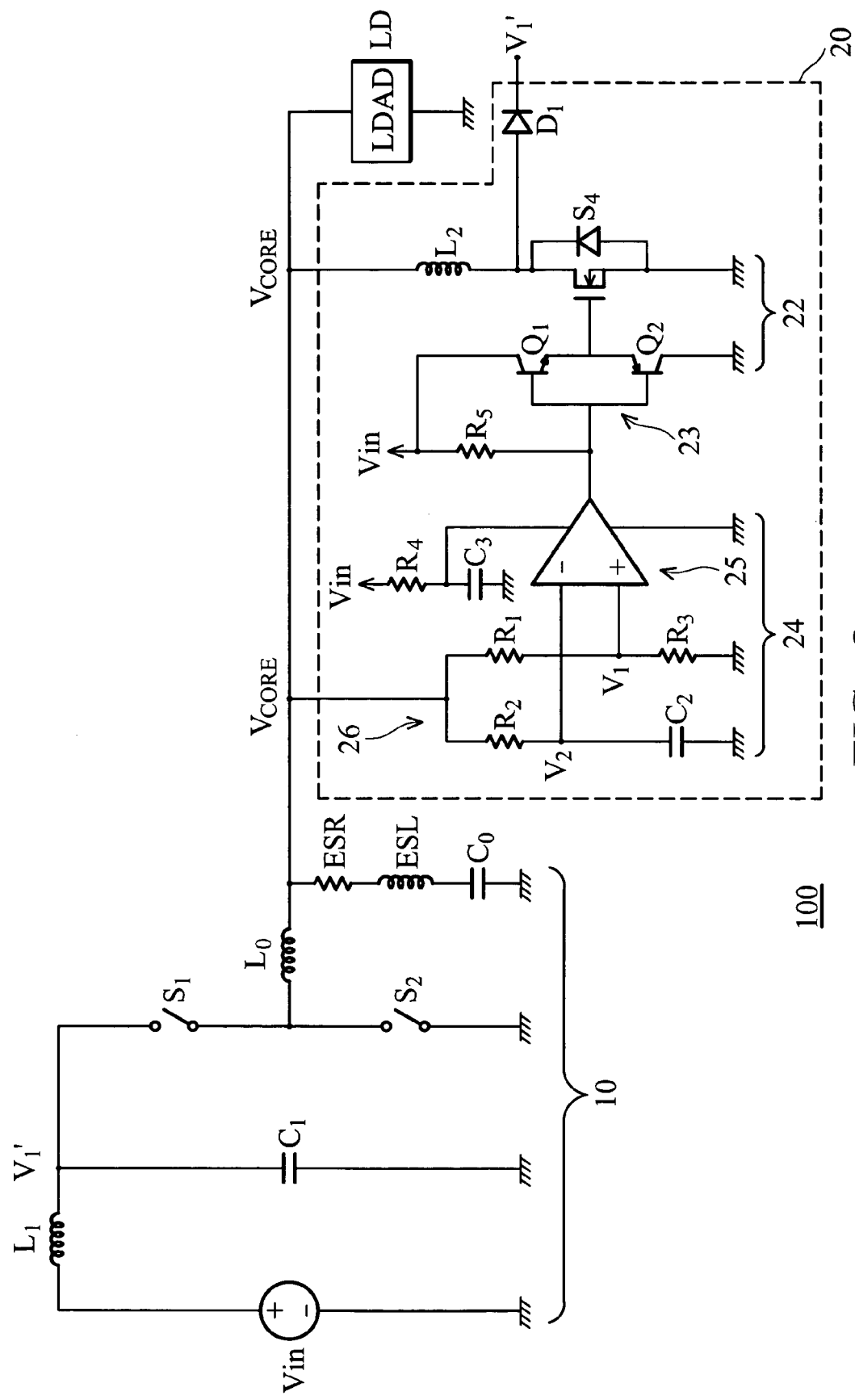
FIG. 2 is a circuit diagram of the active clamping circuit according to the present invention.

FIG. 2 shows a power conversion system 100 with an active clamping load according to the preset invention. As shown in FIG. 2, a buck DC-to-DC conversion circuit 10 is composed of inductors $L_1$ and $L_0$, capacitors $C_1$ and $C_0$ and switching devices $S_1$ and $S_2$, and converts the input voltage Vin, such as 12V, into an output voltage $V_{CORE}$ to the load LD. The switching devices $S_1$ and $S_2$ are switched alternately to maintain the output voltage $V_{CORE}$ at a predetermined voltage, such as 1.35V. For example, when the output voltage $V_{CORE}$ is lower than 1.3V, the switching device $S_1$ is turned on and the switching device $S_2$ is turned off such that the capacitor $C_0$ is charged by the input voltage Vin. When the output voltage $V_{CORE}$ is higher than 1.4V, the switching device $S_1$ is turned off and the switching device $S_2$ is turned on such that the capacitor $C_0$ is not charged by the input voltage Vin.

The active clamping circuit 20 has a voltage adjustment circuit 22 and a determining circuit 24. The voltage adjustment circuit 22 and the determining circuit are both coupled to the output terminal of the DC-to-DC conversion circuit 10. The determining circuit 24 detects the output voltage $V_{CORE}$, and outputs a first enable signal En to enable the voltage adjustment circuit 22 when the output voltage is higher than a first predetermined voltage, such as 1.8V, because the load LD is transferred from a heavy to a light load. The voltage adjustment circuit 22 pulls low the output voltage $V_{CORE}$ according to the first enable signal En.

In this embodiment, the voltage adjustment circuit 22 includes a switching transistor $S_4$ and a driver 23. The driver 23 is composed of an NPN transistor $Q_1$, a PNP transistor $Q_2$ and a resistor $R_5$, and turns on the switching device $S_4$ to pull low the output voltage $V_{CORE}$ according to the first enable signal En.

The determining circuit 24 includes a comparator 25 and a detection circuit 26, wherein the detection circuit 26 is composed of resistors $R_1$~$R_3$ and a capacitor $C_2$, and resistors $R_1$ and $R_2$ both have one end coupled to the output terminal of the DC-to-DC conversion circuit 10. The detection circuit 24 produces a first voltage $V_1$ and a second voltage $V_2$ according to the output voltage $V_{CORE}$. The first voltage $V_1$ varies instantly with the output voltage $V_{CORE}$ because the first voltage $V_1$ is a divided voltage of the output voltage $V_{CORE}$ by the resistors $R_1$ and $R_3$. The second voltage $V_2$ does not vary instantly with the output voltage $V_{CORE}$ because the second voltage $V_2$ is a voltage stored in the capacitor $C_2$. In this case, the detection circuit is designed so that the first voltage $V_1$ is higher than the second voltage $V_2$ when the output voltage $V_{CORE}$ is higher the first predetermined voltage, such as 1.8V. The comparator 22 is coupled to the first voltage $V_1$ and the second voltage $V_2$, and outputs the first enable signal En such that the switching device $S_4$ is turned on by the driver 23 when the first voltage $V_1$ is higher than the second voltage $V_2$.

In this embodiment, the load LD, for example, is a central processing unit (CPU). The load is transferred from a light load to a heavy such that the output voltage $V_{CORE}$ drops instantly when CPU is switched to normal mode from suspend mode. Thus, the switching device $S_1$ is turned on and the switching device $S_2$ is turned off such that the capacitor $C_0$ is charged by the input voltage Vin thereby pulling high the output voltage $V_{CORE}$.

On the contrary, the load is transferred from a heavy to a light load such that the output voltage $V_{CORE}$ is raised instantly (voltage overshoot) when the CPU is switched to suspend mode from normal mode. Thus, the switching device $S_1$ is turned off and the switching device $S_2$ is turned on such that the output voltage $V_{CORE}$ is discharged slowly by the switching device $S_2$. At the same time, the active clamping circuit 20 pulls the output voltage $V_{CORE}$ low when the output voltage $V_{CORE}$ is higher than a first predetermined voltage, such as 1.8V, thereby improving the transient response of the power supply system 100.

Figure 3:
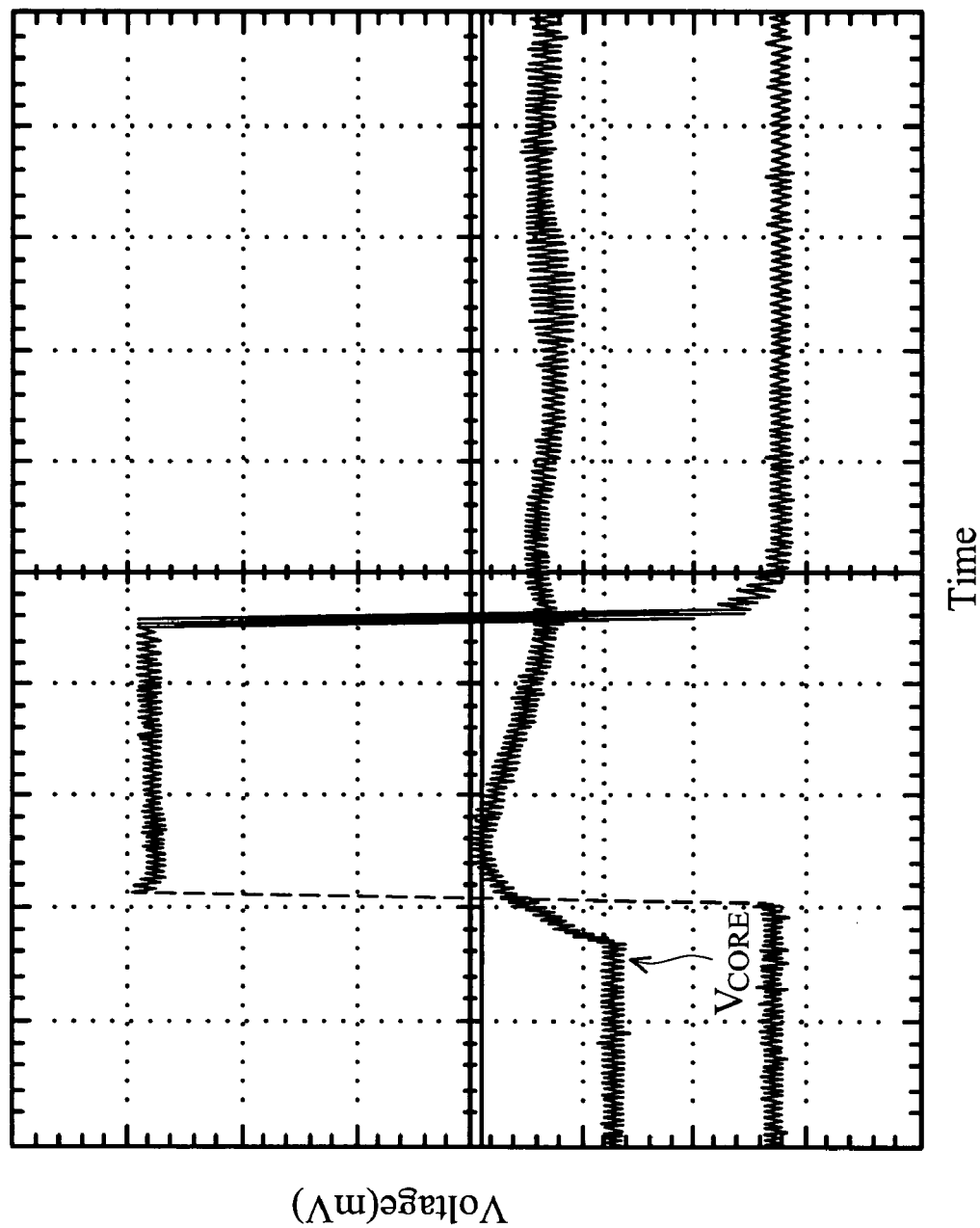
FIG. 3 shows the relationship of the output voltage and the operation of the switching transistor according to the present invention.

FIG. 3 shows the relationship of the output voltage $V_{CORE}$ and the operation of switching transistor $S_4$ according to the present invention. In the power supply system 100, the detection circuit 26 is coupled to the output terminal of the conversion circuit 10, the first voltage $V_1$ may be higher than the second voltage $V_2$ when the output voltage $V_{CORE}$ is higher than the first predetermined voltage (1.8V). Thus, the comparator 25 outputs the first enable signal En to enable. the switching device $S_4$. At this time, energy stored in the inductor $L_0$ may be dissipated to ground by the switching device $S_4$ and inductor $L_2$, and thus, the output voltage $V_{CORE}$ decreases. On the contrary, the comparator 25 stops outputting the first enable signal En such that the switching device $S_4$ is turned off when the first voltage $V_1$ is smaller than second voltage $V_2$. At this time, the voltage at the anode of the diode $D_1$ is increased by energy stored in the inductor $L_2$ because the current flowing through the inductor $L_2$ does not vary instantly. The diode $D_1$ is turned on to produce a conductive path between the inductor $L_2$ and the input terminal $V_1'$ of the DC-to-DC conversion circuit 10 when the voltage difference across the anode and cathode of the diode D1 is higher than the threshold voltage thereof. The energy stored in the inductor $L_2$ can be channeled to the input terminal $V_1'$ until the power conversion system 100 becomes stable. It is noted that, at this time, the output voltage $V_{CORE}$ is smaller than the first predetermined voltage (1.8V) but still higher than 1.3V. Thus, the switching device $S_1$ is not turned on.

Figure 4:
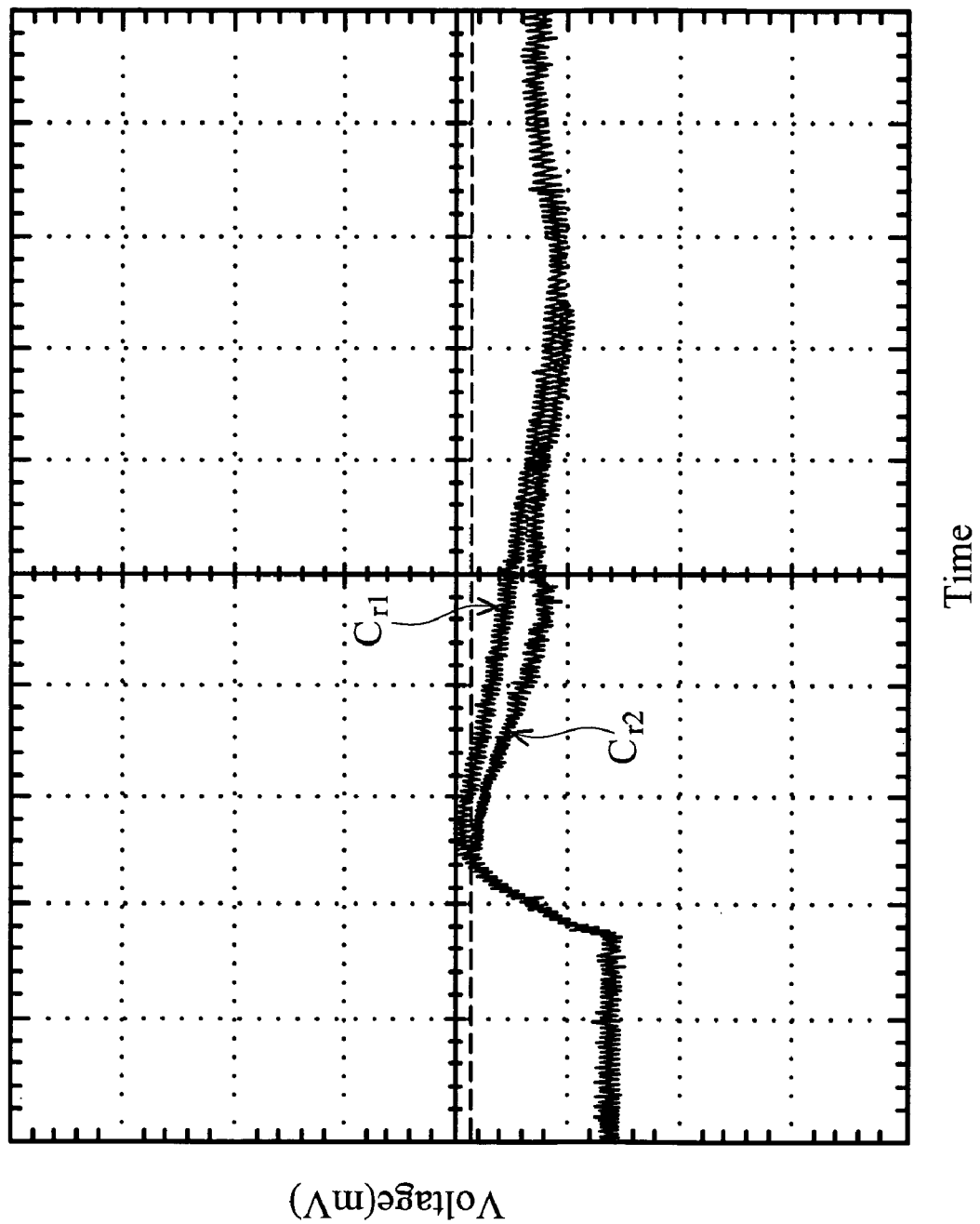
FIG. 4 is a comparison diagram showing transient responses of DC-to-DC conversion circuits of the present invention and in the related art when load is transferred from a heavy to a light load.

FIG. 4 is a diagram comparing the transient responses of DC-to-DC conversion circuits in the present invention with in the related art when the load is transferred from a heavy to a light load. The curve $C_{r1}$ shows the variation of the output voltage when the load is transferred from a heavy to a light load in the DC-to-DC conversion. The curve $C_{r2}$ shows the variation of the output voltage $V_{CORE}$ when the load is transferred from a heavy load to a light load according to the present invention. As shown in FIG. 4, the present invention can dissipate energy stored in the inductor $L_0$ more rapider than the related art, and the load transient response thereof is improved. Furthermore, the present invention can channel the dissipated energy to the input terminal of the DC-to-DC conversion circuit, thereby improving the performance of the power conversion system. In the present invention, the DC-to-DC conversion circuit can be a buck DC-to-DC conversion circuit, a boost DC-to-DC conversion circuit and the like.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An active clamping circuit for a DC-to-DC conversion circuit with an output terminal to output a voltage to a load, comprising:

a determining circuit determining the output voltage and outputting a first enable signal when the output voltage is higher than a first predetermined voltage;

a voltage adjustment circuit coupled to the determining circuit to pull the output voltage low according to the first enable signal;

an energy storage element having a first end coupled to the output terminal of the DC-to-DC conversion circuit; and a first switching device coupled between the energy storage element and an input terminal of the DC-to-DC conversion circuit to produce a conductive path between the an energy storage element and the input terminal of the DC-to-DC conversion circuit when powered on.

2. The active clamping circuit as claimed in claim 1, wherein the determining circuit comprises:

a detection circuit coupled to the output terminal of the DC-to-DC conversion circuit to produce a first voltage and a second voltage according to the output voltage, wherein the first voltage is a divided voltage of the output voltage; and a comparator coupled to the detection circuit to receive the first voltage and the second voltage and output the first enable signal to the voltage adjustment circuit when the first voltage is higher than the second voltage.

3. The active clamping circuit as claimed in claim 1, wherein the first switching device is a diode.

4. The active clamping circuit as claimed in claim 3, wherein the voltage adjustment circuit comprises:

a switching transistor having a first terminal coupled to a second end of the energy storage element and a second terminal coupled to a ground voltage; and a driver turning on the switching transistor to pull the output voltage low according to the first enable signal.

5. The active clamping circuit as claimed in claim 3, wherein the diode is turned on to produce the conductive path between the energy storage element and the input terminal of the DC-to-DC conversion circuit when a voltage difference across the two ends of the diode is higher than the threshold voltage thereof.

6. The active clamping circuit as claimed in claim 1, wherein the DC-to-DC conversion circuit at least comprises:

second and third switching devices coupled to an input voltage, turning on alternately to maintain the output voltage at the first predetermined voltage, wherein the third switching device is turned on when the output voltage is higher than a second predetermined voltage, the second switching device is turned on when the output voltage is lower than a third predetermined voltage, and the first predetermined voltage is higher than second predetermined voltage and the second predetermined voltage is higher than the third predetermined voltage.

7. The active clamping circuit as claimed in claim 1, wherein the DC-to-DC conversion circuit is a step-down (buck) DC-to-DC converter.

8. An active clamping circuit for a DC-to-DC conversion circuit with an output terminal to supply an output voltage to a load, comprising:

a detection circuit coupled to the output terminal of the DC-to-DC conversion circuit to produce a first voltage and a second voltage according to the output voltage;

a comparator coupled to the determining circuit to produce a first enable signal according to the first voltage and the second voltage;

a inductor having a first end coupled to the output terminal of the DC-to-DC conversion circuit;

a switching device having a first terminal coupled to a second end of the inductor and a second terminal coupled to a ground voltage;

a diode coupled between the second end of the inductor and an input terminal of the DC-to-DC conversion circuit; and a driver turning on to pull the output voltage low according to the first enable signal.

9. The active clamping circuit as claimed in claim 8, wherein the diode is turned on to produce the conductive path between the inductor and the input terminal of the DC-to-DC conversion circuit when a voltage difference across the two ends of the diode is higher than the threshold voltage thereof.

10. A power supply system, comprising:

a DC-to-DC conversion circuit converting an input voltage to an output voltage and outputting to a load through an output terminal thereof;

a determining circuit determining the output voltage and outputting an first enable signal when the output voltage is higher than a first predetermined voltage;

a inductor having a first end coupled to the output terminal of the DC-to-DC conversion circuit;

a diode coupled between the inductor and an input terminal of the DC-to-DC conversion circuit; and a voltage adjustment circuit coupled to the determining circuit to pull the output voltage low according to the first enable signal.

11. The power supply system as claimed in claim 10, wherein the voltage adjustment circuit comprises:

a switching transistor having a first terminal coupled to a ground voltage and a second terminal coupled to a second end of the inductor and an anode of the diode; and a driver turning on the switching transistor to pull low the output voltage according to the first enable signal.

12. The power supply system as claimed in claim 10, wherein the DC-to-DC conversion circuit at least comprises:

first and second switching devices coupled to an input voltage, turning on alternately to maintain the output voltage at the first predetermined voltage, wherein the second switching device is turned on when the output voltage is higher than a second predetermined voltage, the first switching device is turned on when the output voltage is lower than a third predetermined voltage, and the first predetermined voltage is higher than second predetermined voltage and the second predetermined voltage is higher than the third predetermined voltage.

13. The power supply system as claimed in claim 10, wherein the determining circuit comprises:

a detection circuit coupled to the output terminal of the DC-to-DC conversion circuit to produce a first voltage and a second voltage according to the output voltage, wherein the first voltage is a divided voltage of the output voltage; and a comparator coupled to the detection circuit to receive the first voltage and the second voltage and output the first enable signal to the voltage adjustment circuit when the first voltage is higher than the second voltage.

14. The power supply system as claimed in claim 10, wherein the diode is turned on to produce the conductive path between the inductor and the input terminal of the DC-to-DC conversion circuit when a voltage difference across the two ends of the diode is higher than the threshold voltage thereof.

15. The power supply system as claimed in claim 10, wherein the DC-to-DC conversion circuit is a buck DC-to-DC converter.

16. The power supply system as claimed in claim 8, wherein the DC-to-DC conversion circuit is a boost DC-to-DC converter.

* * * * *